2,814,614
United States Patent Office
Patented Nov. 26, 1957

---

2,814,614

NEW CONVERSION PRODUCTS OF AZO DYE-STUFFS CONTAINING METAL COMPOUNDS IN COMPLEX UNION

Christian Zickendraht, Binningen, Switzerland, assignor to Ciba Limited, Basel, Switzerland, a Swiss firm No Drawing. Application March 29, 1954,
Serial No. 419,622

Claims priority, application Switzerland April 2, 1953

12 Claims. (Cl. 260—145)

This invention is based on the observation that valuable new conversion products of azo dyestuffs containing metal in complex union can be made by reacting an azo dyestuff containing metal bound in complex union and which is free from carboxylic acid groups not in ortho-position to an azo linkage and from sulfonic acid groups, with a nitrogenous base not having the character of a dyestuff.

The azo dyestuffs used as starting materials which are free from carboxylic acid groups in positions other than the ortho-position to an azo linkage and from sulfonic acid groups and contain bound in complex union a metal, for example, nickel, aluminium or more especially copper, cobalt or chromium, and may contain two or more of these metals, can be prepared by methods in themselves known by treating the metal-free dyestuff with an agent yielding metal, for example, in an acid, neutral or alkaline medium, under atmospheric or superatmospheric pressure, if desired, in the presence of a suitable addition which enhances solubility or the formation of the complex. Especially suitable are the metalliferous monoazo-dyestuffs obtained by treating an ortho-carboxy-ortho'-hydroxy-monoazo-dyestuff or an ortho-hydroxy-ortho' - amino - monoazo - dyestuff and especially an ortho:ortho'-dihydroxy-monoazo-dyestuff with an agent yielding metal, advantageously an agent yielding chromium or cobalt, in such manner that a complex metal compound is obtained which contains, per molecular proportion of monoazo-dyestuff, less than one atomic proportion of metal, and advantageously about ½ atomic proportion of metal. Such complex metal compounds, some of which are known, can be made, for example, by reacting an agent yielding metal with two metallizable monoazo-dyestuffs free from carboxylic acid groups in positions other than in a position vicinal to the azo linkage and from sulfonic acid groups in the molecular ratio of about 1:1:1. The two monoazo-dyestuffs may be identical or different. It is of advantage to use two ortho:ortho'-dihydroxy-monoazo-dyestuffs free from sulfonic acid and carboxylic acid groups, at least one of which dyestuffs contains a sulfonic acid amide group or an alkyl sulfone group, and which dyestuffs may, if desired, be of different constitution but are advantageously of the same constitution. A large number of monoazo-dyestuffs of the constitutions mentioned above is known. They are obtained by methods in themselves known by coupling an ortho-carboxy- or ortho-hydroxy-diazo-compound, advantageously an ortho-hydroxy-diazo-compound of the benzene series containing a sulfonic acid amide group or an alkyl sulfone group, with a compound which couples in a position vicinal to an aromatically bound amino or hydroxyl group or an enolizable or enolized keto group. The treatment of the resulting monoazo dyestuffs with the agent yielding metal is advantageously carried out in a weakly acid to alkaline medium. Accordingly, there come into consideration as agents yielding metal advantageously metal compounds which are stable in alkaline media such, for example, as metal compounds, especially cobalt or chromium compounds, of aliphatic hydroxy-carboxylic acids or dicarboxylic acids, and chromium compounds of aromatic ortho-hydroxy-carboxylic acids which contain the metal in complex union. As examples of aliphatic hydroxy-carboxylic acids and dicarboxylic acids there may be mentioned, inter alia oxalic acid, lactic acid, glycollic acid, citric acid and especially tartaric acid, and among the aromatic ortho-hydroxy-carboxylic acids there may be mentioned, for example, those of the benzene series such as 4-, 5- or 6-methyl-1-hydroxybenzene-2-carboxylic acid and above all 1-hydroxybenzene-2-carboxylic acid itself. As agents yielding cobalt there may be used also simple compounds of divalent cobalt such as cobalt sulfate or cobalt acetate.

The manufacture of metal compounds suitable as starting materials in the present process is described, for example, in U. S. Patents No. 2,565,898 and 2,673,199.

As nitrogenous bases not having the character of dyestuffs there may be used colorless tertiary, secondary or primary organic amines. It is of advantage to use a simple amine of low molecular weight, that is to say containing less than 10 and advantageously 3–7 carbon atoms, preferably those of the aliphatic or aromatic series. As examples of suitable amines there may be mentioned: Methylamine, ethylamine, isopropylamine, n-butylamine, secondary butylamine, tertiary-butylamine, octylamine, dodecylamine, cyclohexylamine, phenyl-amine, paratolylamine, dimethylamine, diethylamine, N-methyl-phenylamine, N-ethyl-phenylamine, trimethyl-amine, triethylamine, N-dimethyl-phenylamine, benzyl-amine, and also the fatty amine from coconut oil, eth-anolamine, pyridine, quinoline, pyrrolidine, furfurylamine and the like.

These amines are advantageously used in the form of their mineral acid salts, for example, their sulfates or hydrochlorides.

The reaction of the azo dyestuffs containing metal in complex union with the amines or salts thereof may be carried out at room temperature or with the aid of heat, if desired, in the presence of an organic solvent. Advantageously, one or more of these amines or their salts are added to an aqueous solution of one of the complex dyestuff-metal compounds, whereby the corresponding conversion product is precipitated in an easily filterable form and can be isolated. The reaction can be carried out with the dyestuff solution at various pH values, but advantageously at a pH value ranging from 5.5 to 9.5. In many cases the reaction mixture, which results from the conversion of the metal-free dyestuff into the corresponding complex metal compound, may be used directly for the reaction.

The products of the process are new. They are conversion products (salts) of azo dyestuffs which contain metal in complex union and which are free from carboxylic acid groups in positions other than a position vicinal to an azo linkage and from sulfonic acid groups, with nitrogenous bases not having the character of dyestuffs. The nature of the chemical combination between the base and the dyestuff-metal complex is not known. The conversion products are, however, quite definite crystalline bodies, which contain less than one mol of base per mol of dyestuff.

They are soluble in organic solvents such as esters, alcohol and especially acetone, and they are indeed more soluble than the dyestuff-metal compounds used for making them. They are suitable for coloring natural or artificial resins, waxes, lacquers and plastic masses, for example, cellulose ethers or esters, for example for spin-dyeing cellulose acetate silk, and also for coloring natural or synthetic polymers such as superpolyamides and superpolyurethanes. The dyeings or colorings obtained with the conversion products of the invention are distinguished by a remarkable fastness to light.

The following examples illustrate the invention, the parts and percentages being by weight:

Example 1

42.9 parts of the sodium salt of the dyestuff from diazotized 2 - amino - 1 - hydroxybenzene-4-sulfonic acid amide and 1-(4'-chlorophenyl)-3-methyl-5-pyrazolone are dissolved in 500 parts of water and 13.3 parts of a sodium hydroxide solution of 30 percent strength and, after the addition of 120 parts of a solution of sodium chromo-salicylate having a chromium content of 2.6 percent, the whole is heated for 3 hours, under reflux. At the end of this period the metallization is finished. The mixture is allowed to cool to 30° C., and an aqueous solution of 23 parts of butylamine hydrochloride is added. The reaction product formed separates out to a great extent. The mixture is then neutralized with acetic acid, and the completely precipitated conversion product is filtered off. When dry it is a brown powder, which dissolves very well in the usual organic solvents. A solution of the product in a nitrocellulose lacquer yields orange coatings which are fast to light on suitable supports.

By using the product for dyeing acetyl-cellulose in the spinning mass there are also obtained orange dyeings having good properties of fastness.

By reacting the aforesaid metalliferous dyestuff in the same manner with cyclohexylamine hydrochloride, there is obtained an orange dyeing product which is likewise easily soluble in organic solvents.

Example 2

The cobalt compound, prepared from 40 parts of the sodium salt of the dyestuff from diazotized 4-chloro-2-amino-1-hydroxybenzene-5-sulfonic acid amide and β-naphthol, is dissolved hot in the form of a moist paste (filter cake) in 1500 parts of water. There is added to the dyestuff solution, while stirring well, an aqueous solution of 19 parts of isopropylamine hydrochloride. The greater part of the reaction product so formed separates out. By the addition of acetic acid the precipitation is completed. The precipitate is filtered off and dried. There is obtained a dark powder, which dissolves very well in alcohol and acetone. A solution of the product in a nitro-cellulose lacquer yields reddish violet coatings on suitable supports.

Example 3

The cobalt compound, prepared from 40 parts of the sodium salt of the dyestuff from diazotized 4-chloro-2-amino-1-hydroxybenzene-5-sulfonic acid amide and β-naphthol, is dissolved hot in the form of a moist paste (filter cake), in 1000 parts of water. The mixture is allowed to cool to 40° C., and 16 parts of butylamine are added to the dyestuff solution. The whole is stirred for a short time at 40–45° C., during which the complex precipitates in a very fine form. By the addition of acetic acid the reaction product formed is converted into a very good filterable form. After being filtered and dried, it has the same properties as the product described in Example 2.

Similar products are obtained by reacting the complex metal compounds of the dyestuffs mentioned in column I of the following table in a manner described above with the bases mentioned in column III.

| No. | I Dyestuff | II Metal | III Base | IV Tint in nitro-cellulose lacquer |
|---|---|---|---|---|
| 1 | $H_2NO_2S$—[OH, Cl-substituted phenyl]—N=N—[HO, Cl, Cl-substituted naphthyl] | Cr | Methylamine-HCl | Blue. |
| 2 | $H_2NO_2S$—[OH, Cl-substituted phenyl]—N=N—[HO, Cl, Cl-substituted naphthyl] | Cr | Anilinechlorhydrate | Do. |
| 3 | $H_2NO_2S$—[OH, Cl-substituted phenyl]—N=N—[HO, Cl, Cl-substituted naphthyl] | Co | Isopropylamine-HCl | Violet. |
| 4 | $H_2NO_2S$—[OH, Cl-substituted phenyl]—N=N—C(HO-C)=C—OH₃ pyrazolone with phenyl | Cr | Butylamine-HCl | Red. |

| No. | I Dyestuff | II Metal | III Base | IV Tint in nitrocellulose lacquer |
|---|---|---|---|---|
| 5 | (structure with OH, N=N, CO-CH₃, CO-NH-phenyl, NO₂) | Co | Isopropylamine-HCl | Yellow. |
| 6 | (structure with OH, N=N, pyrazolone ring, NO₂, phenyl) | Cr | Butylamine-HCl | Orange. |
| 7 | (structure with OH, N=N, naphthol, SO₂NH₂) | Co | ...do... | Bluish red. |
| 8 | (structure with OH, N=N, naphthol, SO₂NH-cyclohexyl) | Co | ...do... | Do. |
| 9 | (structure with OH, N=N, pyrazolone, SO₂CH₃, phenyl) | Cr | ...do... | Orange. |
| 10 | (structure with OH, N=N, naphthol-OH, CH₃HNO₂S, Cl) | Co | Diethylamine | Reddish violet. |
| 11 | (structure with OH, N=N, naphthol-OH, CH₃HNO₂S, Cl) | Co | Ethanolamine | Do. |

| No. | I Dyestuff | II Metal | III Base | IV Tint in nitrocellulose lacquer |
|---|---|---|---|---|
| 12 | 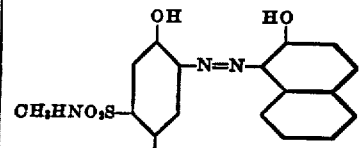 | Co | Morpholine | Do. |
| 13 | 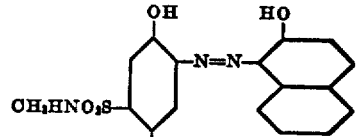 | Co | Pyridine | Do. |
| 14 | 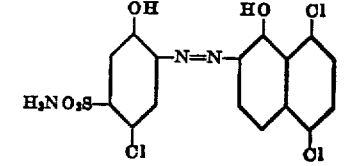 | Ni | Isopropylamine | Do. |
| 15 | 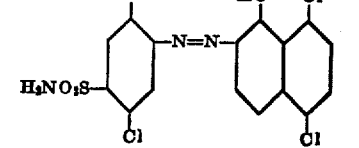 | Al | ......do...... | Bluish violet. |
| 16 | 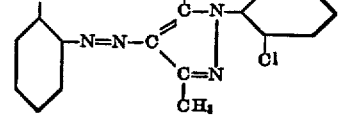 | Cr | ......do...... | Yellow. |
| 17 | 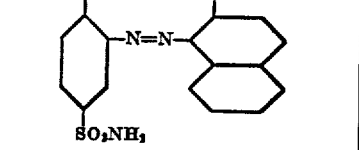 | Co | NH₄Cl | Bluish red. |
| 18 | 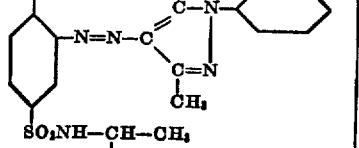 | Co | Isopropylaminechlorhydrate. | Yellowish orange. |
| 19 | 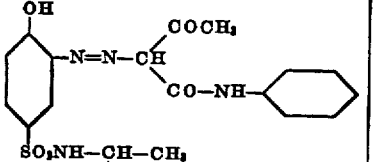 | Co | ......do...... | Yellow. |
| 20 | 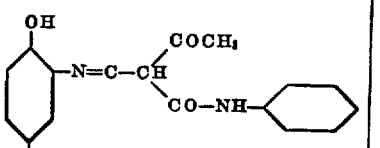 | Co | Hexylamine | Do. |

Example 4

23.4 parts of the sodium salt of the dyestuff prepared from diazotized 4-chloro-2-amino-1-hydroxybenzene-5-sulfonic acid amide and 5:8-dichloro-1-hydroxynaphthalene are stirred in 300 parts of water and 6.6 parts of a sodium hydroxide solution of 30 percent strength. The whole is heated to 80° C., and there is added a solution of 12.5 parts of $CuSO_4 \cdot 5H_2O$ in 50 parts of water and 25 parts of an ammonium hydroxide solution of 25 percent strength. The copper complex precipitates out completely. It is reacted with isopropylamine hydrochloride as described in Example 2. The dyestuff so obtained is a violet-black powder which dissolves well in alcohol and acetone. A solution of the dyestuff in a nitrocellulose lacquer yields bluish violet coatings on suitable supports.

Example 5

The chromium mixed complex, prepared by chroming a dyestuff mixture consisting of 14.8 parts of the sodium salt of the dyestuff from diazotized 4-nitro-2-amino-1-hydroxybenzene and para-cresol and 19.9 parts of the sodium salt of the dyestuff from diazotized 2-amino-1-hydroxybenzene-4-sulfonic acid amide and acetoacetic acid anilide, is added in the form of a moist paste (filter cake) to 1000 parts of water and dissolved hot therein. An aqueous solution of 23 parts of butylamine hydrochloride is added to the dyestuff solution, while stirring well, and the precipitated product is filtered off. When dry it is a dark brown powder which dissolves very well in alcohol and acetone. A solution of the product in a nitrocellulose lacquer yields yellowish brown coatings on suitable supports.

Similar products are obtained by reacting the mixed complexes mentioned in column I of the following table in the manner described above with the bases mentioned in column III:

| No. | I<br>Mixed complex | III<br>Base | IV<br>Tint in nitrocellulose lacquer |
|---|---|---|---|
| 1 | Cobalt mixed complex of the dyestuffs of the formulae 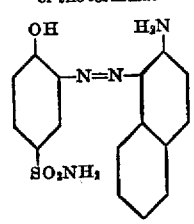 and 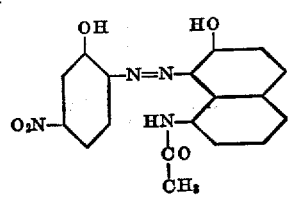 | Butylamine HCl | Black. |
| 2 | Cobalt mixed complex of the dyestuffs of the formulae 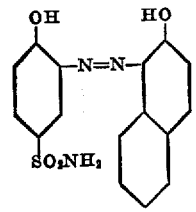 and 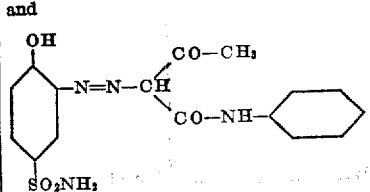 | Isopropylamine HCl | Red-brown. |
| 3 | Chromium mixed complex of the dyestuffs of the formulae 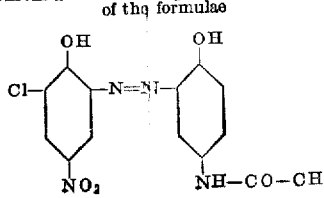 | do | Brown. |

| No. | I<br>Mixed complex | III<br>Base | IV<br>Tint in nitrocellulose lacquer |
|---|---|---|---|
| 4 | and 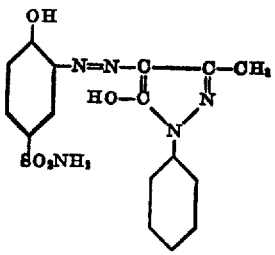 Cobalt mixed complex of the dyestuffs of the formulae 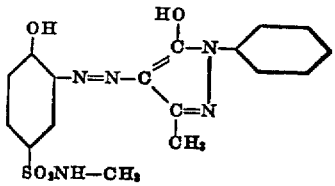 | do | Do. |
| 5 | and 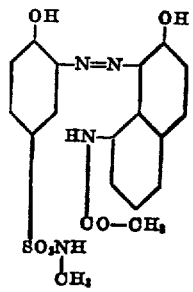 Cobalt mixed complex of the dyestuffs of the formulae 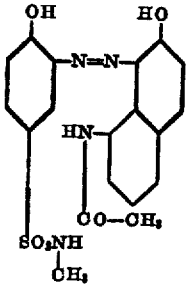 | do | Yellowish brown. |
| 6 | and 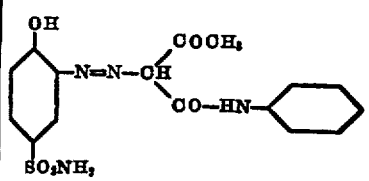 Cobalt mixed complex of the dyestuffs of the formulae 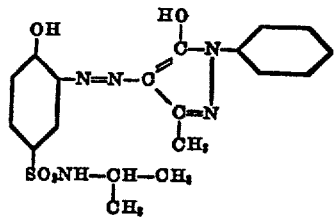 | do | Khaki. |

| No. | I<br>Mixed complex | III<br>Base | IV<br>Tint in nitrocellulose lacquer |
|---|---|---|---|
| 7 | and [structure: H₃C—CO—HN—phenyl(OH)(NO₂)—N=N—naphthyl(OH)(HN-COCH₃)]<br>Cobalt mixed complex of the dyestuffs of the formulae<br>[structure: H₃C—CO—HN—phenyl(OH)(NO₂)—N=N—naphthyl(OH)(HN-COCH₃)]<br>and<br>[structure: phenyl(OH)(SO₂NH₂)—N=N—CH(COCH₃)—CO—HN—phenyl] | do | Do. |
| 8 | Chromium mixed complex of the dyestuffs of the formulae<br>[structure: phenyl(OH)—N=N—naphthyl(OH)(SO₂NH—CH—CH₃ with CH₃)]<br>and<br>[structure: phenyl(OH)(SO₂NH—CH₃)—N=N—C=C(HO)(pyrazole with N-phenyl, CH₃)] | do | Reddish brown. |

What is claimed is:

1. A reaction product of a colorless aliphatic monoamine containing up to 7 carbon atoms with a complex monoazo dyestuff metal compound containing one atom of a metal selected from the group consisting of chromium and cobalt bound in complex union with substantially two monoazo dyestuff molecules selected from the group consisting of an o-carboxy-benzene-o'-hydroxymonoazo dyestuff free from further carboxylic acid and from sulfonic acid groups and an o:o'-dihydroxymonoazo dyestuff free from carboxylic acid and sulfonic acid groups and containing at least one hydroxybenzene radical.

2. A reaction product of a colorless aliphatic monoamine containing up to 7 carbon atoms with a complex cobalt compound containing one atom of cobalt bound in complex union with substantially two o:o'-dihydroxymonoazo dyestuff molecules free from sulfonic acid and carboxylic acid groups and of which at least one contains a sulfonic acid amide group and both contain a hydroxybenzene radical.

3. A reaction product of a colorless aliphatic monoamine containing up to 7 carbon atoms with a complex chromium compound containing one atom of chromium bound in complex union with substantially two o:o'-dihydroxymonoazo dyestuff molecules free from sulfonic acid and carboxylic acid groups and of which at least one contains a sulfonic acid amide group and both contain a hydroxybenzene radical.

4. A reaction product of a colorless aliphatic monoamine containing up to 7 carbon atoms with a complex cobalt compound containing one atom of cobalt bound in complex union with substantially two o:o'-dihydroxy-monoazo dyestuff molecules free from sulfonic acid and carboxylic acid groups and corresponding to the formula

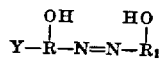

wherein Y represents a sulfonic acid amide group, R represents a benzene radical bound to the azo linkage in ortho position relatively to the OH-group and $R_1$—OH represents the radical of a coupling component bound to the azo group in a position vicinal to the OH-group.

5. A reaction product of a colorless aliphatic monoamine containing up to 7 carbon atoms with a complex chromium compound containing one atom of chromium bound in complex union with substantially two o:o'-dihydroxy-monoazo dyestuff molecules free from sulfonic acid and carboxylic acid groups and corresponding to the formula

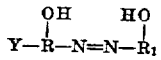

wherein Y represents a sulfonic acid amide group, R represents a benzene radical bound to the azo linkage in ortho position relatively to the OH-group and $R_1$—OH represents the radical of a coupling component bound to the azo group in a position vicinal to the OH-group.

6. A reaction product of a saturated aliphatic primary monoamine containing 3 to 7 carbon atoms with a complex cobalt compound containing one atom of cobalt bound in complex union with substantially two dyestuff molecules free from sulfonic acid and carboxylic acid groups and corresponding to the formula

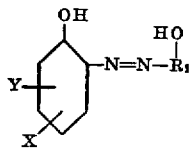

wherein Y represents a sulfonic acid amide group, X represents a member of the group consisting of a hydrogen and a chlorine atom and $R_1$—OH represents the radical of a coupling component bound to the azo group in a position vicinal to the OH-group.

7. A reaction product of a saturated aliphatic primary monoamine containing 3 to 7 carbon atoms with a complex chromium compound containing one atom of chromium bound in complex union with substantially two dyestuff molecules free from sulfonic acid and carboxylic acid groups and corresponding to the formula

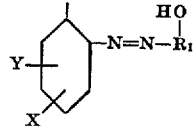

wherein Y represents a sulfonic acid amide group, X represents a member of the group consisting of a hydrogen and a chlorine atom and $R_1$—OH represents the radical of a coupling component bound to the azo group in a position vicinal to the OH-group.

8. The reaction product of n-butylamine with the complex cobalt compound containing one atom of cobalt bound in complex union with substantially two dyestuff molecules both of which correspond to the formula

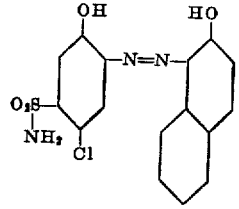

9. The reaction product comprising isopropylamine with the complex cobalt compound containing one atom of cobalt bound in complex union with substantially two dyestuff molecules of which both correspond to the formula

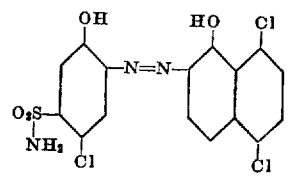

10. The reaction product of isopropylamine with the complex cobalt compound containing one atom of cobalt bound in complex union with substantially two dyestuff molecules of which one corresponds to the formula

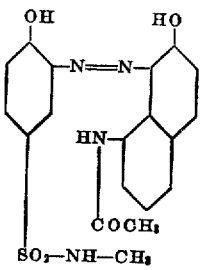

and the other to the formula

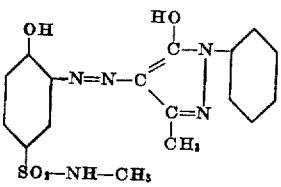

11. The reaction product of isopropylamine with the complex cobalt compound containing one atom of cobalt bound in complex union with substantially two dyestuff molecules of which one corresponds to the formula

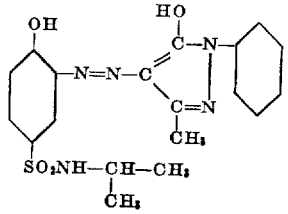

and the other to the formula

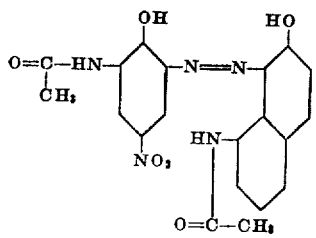

12. The reaction product of isopropylamine with the complex chromium compound containing one atom of chromium bound in complex union with substantially two dyestuff molecules of which one corresponds to the formula
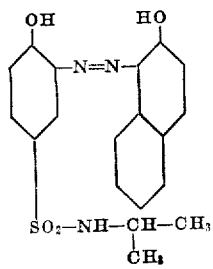
and the other to the formula
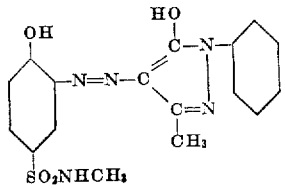
References Cited in the file of this patent
UNITED STATES PATENTS
| | | |
|---|---|---|
| 1,843,376 | Stusser | Feb. 2, 1932 |
| 2,215,105 | Krzikalla | Sept. 17, 1940 |
| 2,315,870 | Nadler et al. | Apr. 6, 1943 |

U. S. DEPARTMENT OF COMMERCE
PATENT OFFICE

CERTIFICATE OF CORRECTION

Patent No. 2,814,614                                                        November 26, 1957

Christian Zickendraht

It is hereby certified that error appears in the printed specification of the above numbered patent requiring correction and that the said Letters Patent should read as corrected below.

Column 16, line 12, claim 9, for "comprising" read -- of --.

Signed and sealed this 15th day of April 1958.

(SEAL)
Attest:
KARL H. AXLINE
Attesting Officer

ROBERT C. WATSON
                                                                 Commissioner of Patents